May 20, 1924.

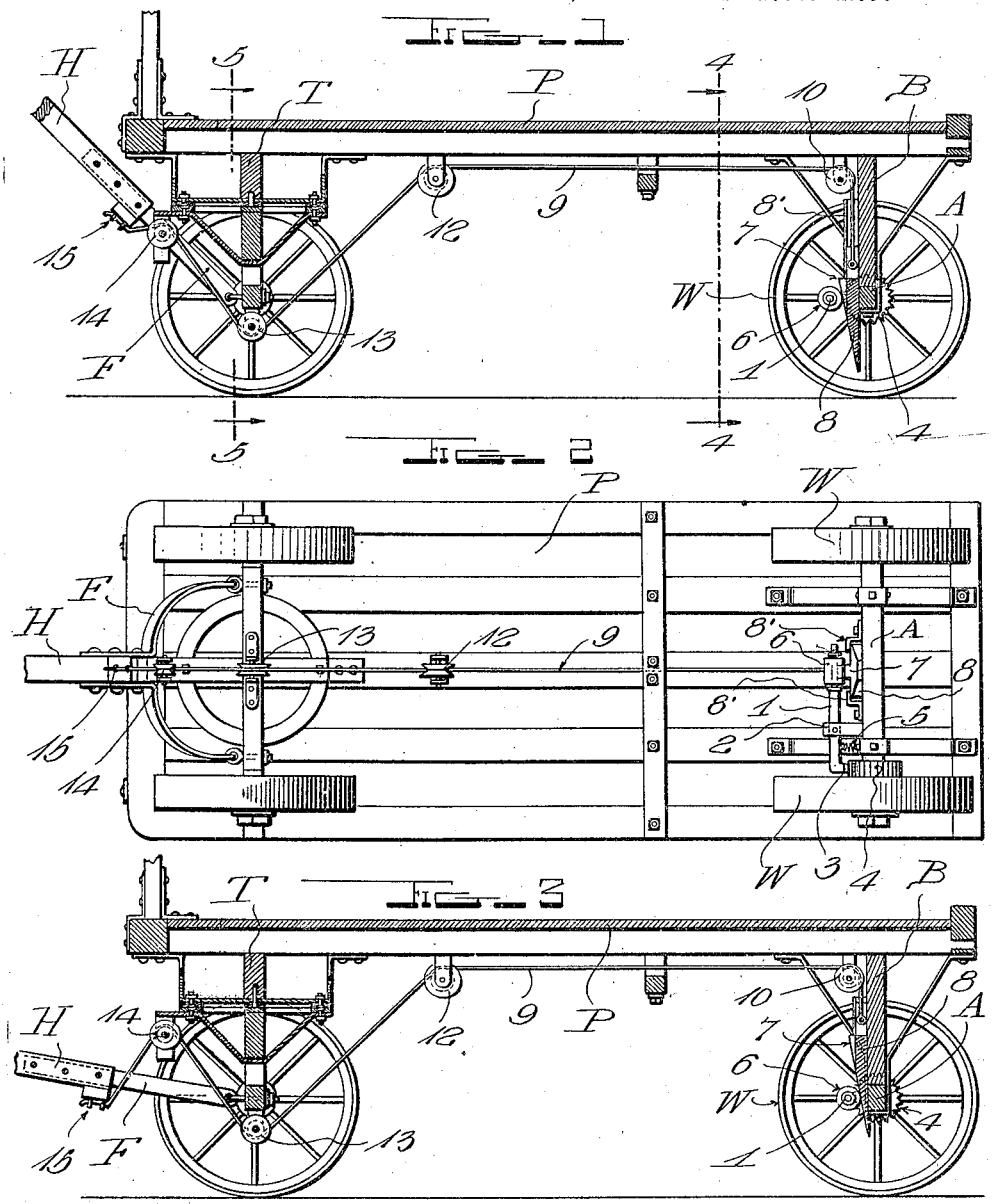

J. A. PATTERSON

BRAKE FOR HAND TRUCKS

Filed Dec. 14, 1922  2 Sheets-Sheet 2

1,495,104

Witness

Inventor
John A. Patterson
By H. B. Wilson & Co.
Attorneys

Patented May 20, 1924.

1,495,104

UNITED STATES PATENT OFFICE.

JOHN A. PATTERSON, OF SPRINGFIELD, MISSOURI, ASSIGNOR OF ONE-HALF TO WALTER N. HAZEL, OF MEMPHIS, TENNESSEE.

BRAKE FOR HAND TRUCKS.

Application filed December 14, 1922. Serial No. 606,867.

*To all whom it may concern:*

Be it known that I, JOHN A. PATTERSON, a citizen of the United States, residing at Springfield, in the county of Greene and State of Missouri, have invented certain new and useful Improvements in Brakes for Hand Trucks; and I do declare the following to be a full, clear, and exact description of the invention, such as will enable others skilled in the art to which it appertains to make and use the same.

This invention relates to an improved brake for use in connection with a hand truck of the type used at railroad stations for moving baggage and one object of the invention is to provide a brake structure in which a brake element may be moved into an operative position by means of a sliding weight and to connect this weight with the operating handle of the truck by means of a cable so that the weight may serve to retain the handle in an elevated position when the truck is stationary and the handle when swung downwardly serves to draw the weight upwardly to an inoperative position and permit the brake to move to a releasing position.

Another object of the invention is to so construct the brake structure that the brake may be in the form of a pivoted lever having one end portion provided with a tooth for engaging a ratchet forming gear or pinion carried by one of the rear wheels of the truck, the other end portion of the lever extending into position for engagement by the weight which will be slidably mounted for movement vertically of the rear bolster of the truck.

Another object of the invention is to provide a brake structure in which the actuating cable which leads from the weight to the handle or tongue of the truck may be guided in its movement and prevented from interfering with proper turning of the fifth wheel and front axle of the truck.

Another object of the invention is to so construct this brake structure that it may be readily applied to hand trucks of a conventional construction in which no brake is ordinarily provided and thus permit of the brake structure being applied to trucks already in use.

This invention is illustrated in the accompanying drawings, wherein:

Figure 1 is a longitudinal sectional view through a baggage truck showing the brake in an operative position and the tongue or handle swung upwardly out of the way.

Figure 2 is a bottom plan view of the baggage truck with the improved brake mechanism applied thereto.

Figure 3 is a view similar to Fig. 1 showing the pulling handle drawn downwardly to a position for use and the brake mechanism released.

Figure 4:
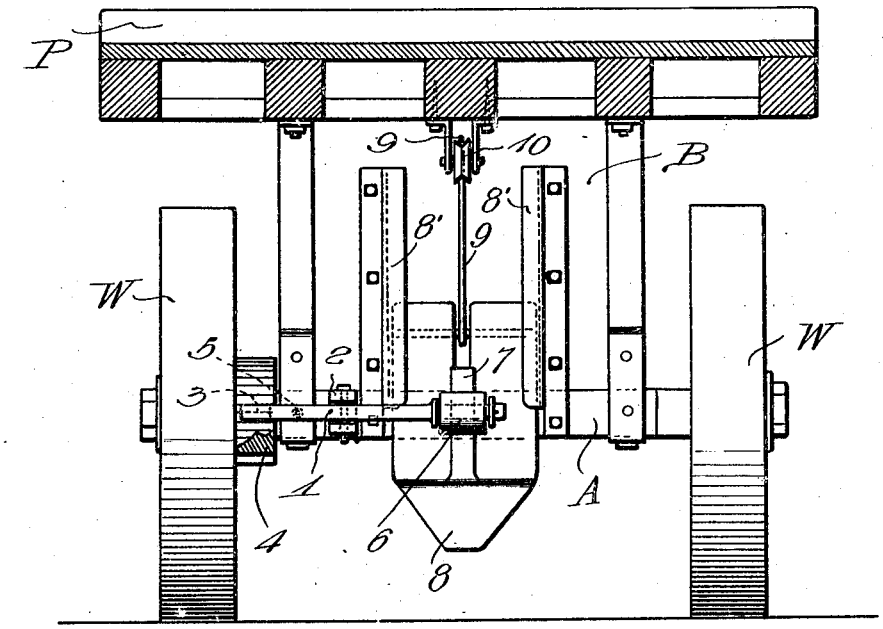
Figure 4 is an enlarged transverse sectional view taken along the line 4—4 of Fig. 1.
Figure 5:
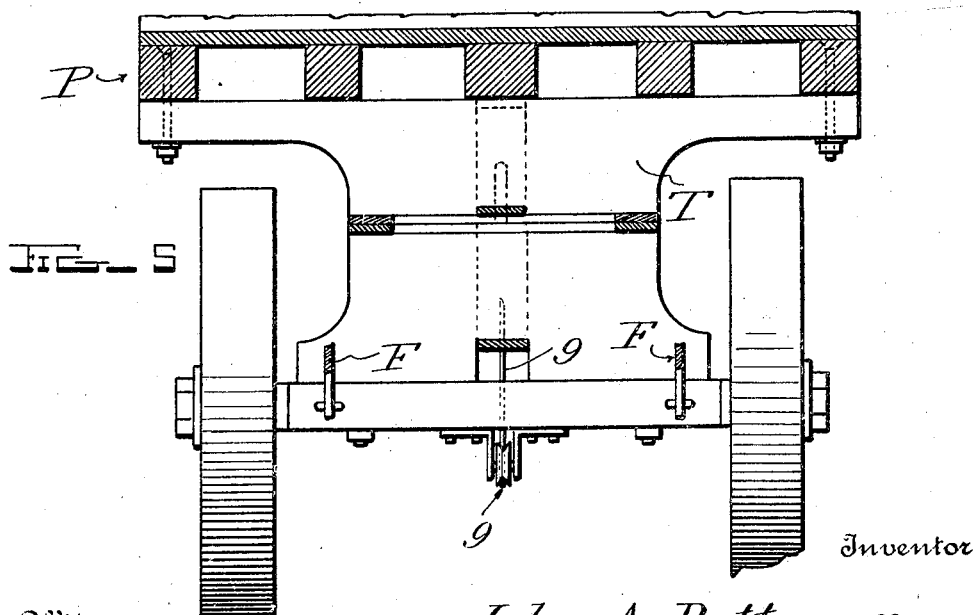
Figure 5 is an enlarged transverse sectional view taken along the line 5—5 of Fig. 1.

This brake has been shown in use in connection with a hand truck which is of a conventional construction and provided with a platform P, a rear bolster B to which is secured the rear axle A which carries the usual rear wheel W. The usual front truck which is indicated in general by the letter T has been provided and there has also been provided the usual handle H which is mounted for vertical swinging movement by the usual forks F. It will, of course, be understood that the truck illustrated is only illustrated as showing a conventional structure of truck and that the brake structure may be used in connection with any truck upon which it can be conveniently applied and which includes a vertically swinging handle.

This brake is provided with a gripping device in the form of a latch bar or lever 1 which is pivotally mounted by means of a bearing block 2 carried by the rear axle A and projected forwardly with the latch bar 1 extending transversely of the truck. At its outer end, the bar is provided with a tooth 3 which extends rearwardly and may be brought into engagement with the teeth of a gear or pinion 4 secured to the hub of one of the rear wheels. A spring 5 is provided to engage the outer end portion of this latch bar and normally retain the latch bar in an inoperative position with the pawl or tooth 3 out of engagement with the pinion 4. Therefore, when the truck is in use, the latch bar will be retained in an inoperative position and movement of the truck will not be interfered with. The inner end portion of this latch bar terminates intermediate the width of the bolster B and this inner end portion of the latch bar carries a roller 6 so that the latch bar may be easily swung to an operative position by means of a cam 7 which extends vertically of the weight 8 and moves into engagement with the roller when the weight moves downwardly between the track strips 8' carried by the bolster. This weight is tapered downwardly so that when the weight is drawn upwardly to an inoperative position by pulling upon the cable 9 and the weight then permitted to move downwardly towards the operative position the lower end of the weight may readily pass between the axle and the roller at the inner end of the latch bar. This weight is to be connected with the handle H of the truck so that the weight can serve to normally retain the handle in the raised position and the handle when swung downwardly to a pulling position serves as means for drawing upon the cable to move the weight upwardly and permits the latch to move to an inoperative position. Therefore, the cable has been carried upwardly and after being passed over a pulley 10 at the upper end of the bolster, has been brought forwardly under the platform through guide 12 which is also preferably in the form of a pulley. The forward guide 12 is positioned somewhat to the rear of the fifth wheel of the front truck and therefore when the cable is carried forwardly and downwardly into engagement with the pulley 13 carried by the front axle, and then upwardly into engagement with the pulley 14 at the front of the fifth wheel, the front truck may be readily turned as far as necessary for guiding of the vehicle without the cable interfering with proper turning of the front truck. The forward end of the cable is connected with the rear end portion of the handle H by means of a suitable clamp 15. The cable is of such length that when the baggage truck is stationary and the handle H allowed to move upwardly, the weight will move downwardly and serve not only as means for holding the handle in a raised position where it will be out of the way, but also serve through engagement of its cam with the roller as means for swinging the latch bar upon its pivot and bring the tooth or pawl 3 of this latch bar into engagement with the pinion or ratchet 4. As long as the weight remains in the lowered position shown in Fig. 1, the latch bar will be retained in the operative position against the action of the spring 5 and the baggage truck will be held against movement and thus prevented from accidentally coasting along a station platform and causing damage. When it is desired to move the baggage truck, the handle is grasped and will be naturally drawn downwardly to a position in which the truck can be readily pulled from one place to another. When the handle is drawn downwardly, the cable is drawn upon by the handle and the weight will be drawn upwardly. The cam will move out of engagement with the roller 6 and the spring 5 will move the latch bar to the inoperative position. The baggage truck can then be readily drawn from one place to another and there will be no danger of the latch bar accidentally moving into an operative position and interfering with ready handling of the truck. As soon as the truck is again brought to a stop and the handle released and permitted to swing upwardly, the weight will again descend and move the latch bar to the operative position. It will thus be seen that the brake structure has been so constructed that swinging of the handle from a raised to a lowered position in which the truck can be easily handled will cause the weight to be drawn upwardly and permit the latch bar to move to an inoperative position and that when the handle is released, the weight will be permitted to again move downwardly to retain the handle in the raised position where it will be out of the way and also serve to move the latch bar to the operative position.

I claim:

1. The combination with a vehicle including a body, forward and rear trucks, supporting wheels carried by the trucks and a tongue pivotally connected with the forward truck for vertical swinging movement, of a brake structure comprising a ratchet connected with a wheel of the rear truck, a latch lever pivotally connected with said rear truck in operative relation to the ratchet, an operating element for moving the latch lever into operative engagement with said ratchet, means for slidably mounting said operating element whereby said operating element may of its own weight normally remain in position to retain the latch lever in an operative position, and means for connecting the operating element with the vertically swinging tongue of the vehicle whereby the operating element when in an operative position may retain the handle in a raised and inoperative position and the handle when swung downwardly to a pulling position may draw the operating element upwardly to a position permitting movement of the latch lever to an inoperative position.

2. The structure of claim 1 having the operating element in the form of a downwardly tapered weight, said means for slidably mounting the operating element consisting of track elements for engaging the side portions of the weight and slidably mounting the weight in position for engaging a handle portion of the latch lever and moving the latch lever to an operative position.

3. The structure of claim 1 having the operating element in the form of a downwardly tapered weight, said means for slidably mounting the operating element consisting of track elements for engaging the side portions of the weight and slidably mounting the weight in position for engaging the handle portion of the latch lever and moving the latch lever to an operative position, the weight being provided with a vertically disposed wedge portion constituting a cam for engaging the handle portion of the latch and imparting movement to the same.

4. The structure of claim 1, said means for connecting the operating element with the handle of the vehicle consisting of a cable to have its end portions connected with the handle and operating element.

5. The structure of claim 1, said means for connecting the operating element with the handle of the vehicle consisting of a cable to have its end portions connected with the handle and operating element, and guide means for slidably mounting said cable for movement longitudinally of a vehicle.

6. The combination with a vehicle comprising a body, a rear truck including wheels, a front guiding truck, and a handle pivotally connected with the front truck for vertical swinging movement, of a ratchet element rigid with one of the wheels of said rear truck, a latch lever pivotally connected with the rear truck and having one end portion engageable with said ratchet and normally held out of engagement therewith, a weight slidable vertically of said rear truck and when moving downwardly engaging the other end portion of said latch lever to move the first mentioned end portion thereof into engagement with said ratchet, and means connecting said weight and handle whereby downward movement of the handle to a pulling position may cause upward movement of the weight to a position permitting movement of the latch lever to an inoperative position.

7. The structure of claim 6 having the weight provided with a downwardly tapered wedge portion forming a cam to engage the latch lever and move the same to an inoperative position when the weight moves downwardly.

8. The structure of claim 6 having the means for connecting the handle and weight consisting of a cable extending longitudinally of the vehicle body and having its rear end connected with the weight and its forward end connected with said handle.

9. The structure of claim 6 having the means for connecting the handle and weight consisting of a cable extending longitudinally of the vehicle body and having its rear end connected with the weight and its forward end connected with said handle, guides for said cable carried by the body of said vehicle and front truck thereof, the forward guide carried by said body being spaced rearwardly of the front truck a sufficient distance to prevent said cable from interfering with turning of the front truck.

10. In a vehicle having a ground engaging wheel and a draft element, a braking mechanism comprising a ratchet connected to said wheel, a pivoted latch lever having on one end a latch disposed for operative engagement with said ratchet, a slidably mounted operating element adapted to be brought into engagement with the opposite end of said latch lever whereby the lever is actuated to engage the latch carried thereby with said ratchet for braking the vehicle, means to actuate said lever for disengaging said latch from said ratchet and means operated by the movement of the draft device of the vehicle to actuate said operating element.

11. In a vehicle having a ground engaging wheel and a draft element, a braking mechanism comprising a ratchet connected to said wheel, a pivoted latch lever having on one end a latch disposed for operative engagement with said ratchet, a slidably mounted operating weight having a cam adapted by downward movement of the weight to be brought into operative engagement with the opposite end of said latch lever whereby the lever is actuated to engage the latch carried thereby with said ratchet for braking the vehicle and a flexible weight operating element connected with said weight and with said draft element for raising and lowering the weight out of and into operative engagement with said latch lever when said draft element is swung downwardly and upwardly.

12. In a vehicle having a ground engaging wheel and draft element, a braking mechanism comprising a ratchet connected to said wheel, a pivoted latch lever having on one end a latch disposed for operative engagement with said ratchet, a roller carried by the opposite end of said lever, a slidably mounted operating weight having a cam adapted by downward movement of the weight to engage said roller whereby the lever is actuated to engage the latch carried thereby with said ratchet, a spring to actuate said lever for disengaging said latch from said ratchet when said weight is moved upwardly and a flexible weight operating element connected with said weight and said draft element whereby the weight is brought into and out of operative position by the movement of said draft means.

In testimony whereof I have hereunto affixed my signature.

JOHN A. PATTERSON.